Oct. 7, 1952 J. ANDERSON ET AL 2,613,201
CONCENTRATION OF PARTIALLY POLYMERIZED DIALLYL PHTHALATE
Filed April 21, 1947
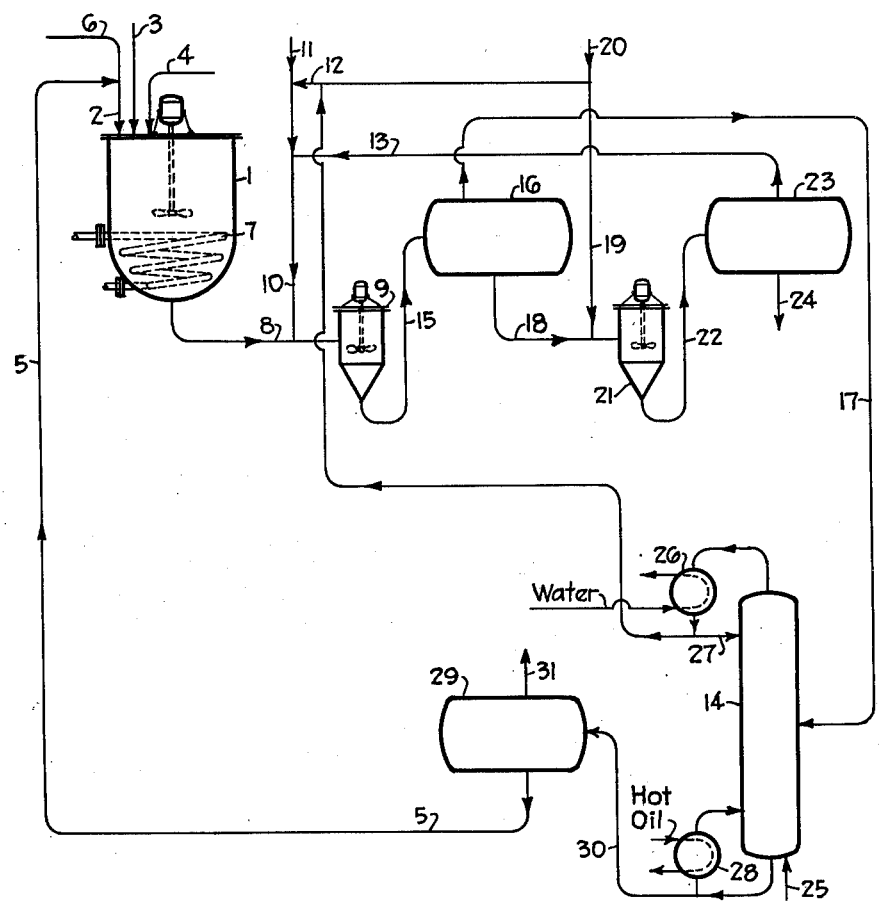
Inventors: John Anderson
John W. Mecorney
George E. Ham
By their Attorney: C. J. Ott Patented Oct. 7, 1952

2,613,201

UNITED STATES PATENT OFFICE 2,613,201

CONCENTRATION OF PARTIALLY POLYMERIZED DIALLYL PHTHALATE

John Anderson, Berkeley, and John W. Mecorney, Albany, Calif., and George E. Ham, Dayton, Ohio, assignors to Shell Development Company, San Francisco, Calif., a corporation of Delaware Application April 21, 1947, Serial No. 742,820

8 Claims. (Cl. 260—78.4)

The present invention relates to the concentration of partial polymers of esters such as diallyl phthalate. More particularly, the invention relates to a process for concentrating esters by solvent extraction.

Esters such as diallyl phthalate are useful in the production of thermosetting resins and their utility is enhanced if they are polymerized in two stages. If one polymerizes in two stages, shrinkage of the finished article is minimized and a shorter cure time is needed which reduces the cost of fabrication. It is also advantageous to partially polymerize the ester and to then separate the soluble polymer from the monomer and utilize only the soluble polymer. It has been found that partial polymers from low conversion processes, i. e. where the initial polymerization is only permitted to cause a slight degree of polymerization, are superior to polymers produced by high conversion processes. On the other hand, the polymers so produced of the highest molecular weight are superior to those of low molecular weight. It has also been found that for finished articles of the highest quality, the initial polymerization should not be conducted in the presence of a solvent, or, if a solvent is used, the quantity of the solvent should be kept at a minimum. Articles produced from esters polymerized in the absence of solvents have greater scratch resistance and greater "hot hardness," i. e. they hold their shape better when first taken from the mold.

It is therefore an object of the present invention to provide a convenient and economical process for the separation of diallyl phthalate (and similar esters) monomer from polymers. It is a further object of this invention to provide a process whereby polymers of varying concentration may be produced so that one may obtain special solutions of polymers which are particularly adapted to certain uses. It is a further object of this invention to provide solutions of polymers which are stable and pumpable so that they may be readily stored and shipped and which involve no handling of solids or viscous materials. Another object of this invention is to provide a practical process of polymerizing esters in the absence of a solvent at a low degree of conversion. Still another object is to provide an extraction process for selectively extracting the polymers of highest molecular weight. Further, it is an object to prepare solutions of polymers wherein the solvent is one which will not interfere with the further polymerization of the polymer to an insoluble and infusible form.

The objects of the present invention are accomplished by employing a dual solvent comprising a mixture of acetone and water which components are combined in such proportions that the resulting dual solvent forms two phases when a diallyl phthalate partial polymer mixture is added thereto. When the said dual solvent is added to the partial polymer two layers are formed, an upper or extract layer containing solvent and monomer and a lower or raffinate layer containing solvent with most of the polymer and a small amount of the monomer. It has been found that by properly selecting the concentrations of solvents and operating temperatures that substantially all of the polymer recovered from the raffinate layer is of high molecular weight and that the ester having a low degree of polymerization will be found in the extract phase with the monomer. Thus, the present invention is advantageous over the heretofore known methods of precipitation polymers by adding water to acetone solutions of the polymers, because such precipitation methods result in the recovery of all of the polymer and not in the selective recovery of only the most desirable portion of the polymer.

The process of the present invention may be conducted in a single separation stage or two or even more stages may be employed. When one does not desire a very high concentration of polymer, for instance for the manufacture of contact laminates, a single stage will suffice, but if one desires a high concentration of polymer, as for use in laminating varnish or molding powder, it is preferred to utilize two or more stages.

It has been found preferable to use from about 65% to 85% by weight of acetone in the solvent mixture used for the first stage of extraction. If over 85% of acetone is used in the first stage, a complete solution of the partial polymer is obtained, so that there is no separation into phases. However, if more than one stage of extraction is used, the acetone concentration may be as high as 87.5% in the second stage. If less than 65% acetone is used, impractically high solvent to polymer ratios would be needed to obtain satisfactory high polymer separations. At a given solvent to partial polymer ratio, a greater concentration effect is brought about by the solutions having the higher acetone concentrations while, however, the polymer recoveries are in the reverse order being higher for the solvent mixtures having the lower acetone concentrations. By the same taken, the selectivity between polymers of different molecular weight is greater for those mixtures containing higher acetone concentrations, i. e. solutions containing a large amount of acetone tend to give raffinate layers containing only the higher molecular weight polymers and polymers of lower molecular weight go to the extract phase.

The amount of water in the acetone-water mixture has an effect on the viscosity of the extract which is produced. Those mixtures which contain a larger amount of acetone give raffinates which are more fluid, for a given polymer concentration, than those with a lesser amount of acetone. Therefore, it is preferred to operate in the final stage of extraction (or in the single stage if only one stage is used) with an acetone concentration near the upper limit. In general, it is preferred to operate the final stage with an acetone concentration of from about 80% to 87.5%.

The volume of dual solvent which is used will depend upon the ultimate concentration of polymer which is desired and also the percentage of acetone which is used in making up the dual solvent. Satisfactory results will be obtained if from about 2.5 to 12 volumes of dual solvent are used per volume of partial polymer and it is preferred to use from about 3.5 volumes to 6 volumes.

The temperature of extraction may vary from 0° C. to 40° C. and is not critical within this range. Generally satisfactory results are obtained at an intermediate point in this range, so that it is preferred to operate at temperatures of from about 20° C. to about 30° C.

In performing the process of the present invention, the partial polymer may be produced and then the solvents added thereto, or less preferably, a portion of the solvents may be added to the monomer prior to polymerization. It is also possible to conduct two or more extractions using different percentages of dual solvent in each stage and one may also vary the percentage of acetone in each stage. For instance, when making a polymer solution in which 95% of the diallyl phthalate is in the form of polymer, one may conduct the first stage of extraction with about 6.0 volumes of a solvent containing 70% acetone and 30% water and conduct the second stage of extraction with about 2 volumes per volume of first stage raffinate of a solvent containing 85% acetone and 15% water.

The partial polymerization of the ester is conducted under mild polymerizing conditions so that little, if any, cross linkage between polymer molecules occurs and the production of an infusible, insoluble polymer is avoided. For polymerization, the ester is preferably used without dilution although a small amount of a suitable solvent such as acetone may be used. A suitable catalyst such as air, benzoyl peroxide or tertiary-butyl hydroperoxide is then added and the mixture is heated to a temperature of from about 135° C. to 240° C. When the diallyl phthalate or other ester is from 20% to 40% polymerized it may be extracted in the manner described below. By the term "20% to 40%" polymerized is meant the condition when from 20% to 40% of the ester molecules exist in the polymerized form, the balance being still in the form of monomer. The extract from the separation contains a large percentage of monomer and may be returned to the polymerization vessel. The solvent may be removed or reduced in quantity before the extract is recycled to the polymerization stage.

In the drawing there is illustrated in diagrammatic manner a preferred method of applying the present invention. In this particular embodiment, there is shown a polymerization step followed by two stages of solvent concentration. In the drawing there is illustrated a polymerization vessel 1, provided with an inlet 2 for the introduction of diallyl phthalate and an inlet 3 for the introduction of air or other polymerization catalyst, such as a peroxide. If desired, another inlet 4 may be provided for the introduction of water or other vaporizable liquid. The use of water is optional and during polymerization the water is evaporated, tending to remove at least a part of the heat of polymerization. The vessel 1 is provided with suitable heating and stirring means, as illustrated, so that the vessel may be heated to the desired temperature to initiate the polymerization reaction. The heating means may consist of a steam coil 7 within the vessel. Recycle diallyl phthalate may be introduced into line 2 through line 5 while fresh diallyl phthalate is introduced through line 6. The partial polymer produced in polymerization vessel 1 is withdrawn from vessel 1 through line 8, mixed wtih a mixture of acetone and water and recycle partial polymer from line 10 and introduced into the first stage mixer 9. These components are supplied to line 10 by line 11 where fresh acetone-water mixture is introduced, line 12 which lead from the steam stripper 14 and recycle second stage extract containing partial polymer is supplied by line 13 which leads from the upper phase produced in the second stage settler 23. Mixer 9 insures rapid and thorough mixing of the partial polymer with the acetone-water mixture. The residence time in mixer 9 is only sufficient to insure thorough mixing of the ester and solvent and may be on the order of one-half minute. From mixer 9, the ester-solvent mixture is conveyed to settler 16 by means of line 15. Settler 16 is sufficiently large to permit stratification to take place which ordinarily requires a residence time of from 2 to 3 hours. In settler 16, two phases are formed, an extract or upper phase containing acetone, water, a minor portion of the polymer and a major portion of the monomer. The extract phase is withdrawn by line 17 and is introduced into steam stripper 14, the function of which will be described later. The raffinate phase is withdrawn through line 18 and is mixed with additional acetone-water mixture from line 19. Line 19 receives recycle acetone-water from line 12 and fresh acetone-water mixture from line 20. The mixture thus produced is introduced into mixer 21, which is similar to mixer 9, and is then introduced by line 22 into the second stage settler 23, which is similar to settler 16. The residence time in settler 23 will be on the order of 10–12 hours. Two phases are formed, and the raffinate is taken off as finished product by line 24. A typical composition of the finished product is: polymer 63.2%, monomer 2.3%, acetone 31.8% and water 2.7% (all parts by weight). This product may be easily stored and utilized as hereinafter described. The extract from settler 23 contains acetone, water, a small amount of polymer and a large amount of monomer and may be withdrawn by line 13 and recycled as illustrated. The extract which is fed into the steam stripper 14 from the first stage settler 16 is contacted with steam, introduced through line 25. This causes the volatilization of a fraction consisting of acetone and water which is taken overhead and condensed by condenser 26. A portion of this mixture may be returned to the column line 27 as reflux and the balance is recycled by line 12 as solvent to the first and second stages of extraction. The bottoms from the steam stripper consist almost entirely of water, monomer and low molecular weight polymer. This mixture is withdrawn from the bottom of the column, and a portion may be passed through a reboiler 28 and returned to the column. The balance is introduced into separator 29 by line 30 where two phases are formed. The upper phase consists almost entirely of water and may be removed by line 31 and the phase consists almost entirely of monomer and low molecular weight polymer and may be recycled to the polymerization vessel by means of line 5.

It is apparent that many modifications may be made in the apparatus described above. For instance, a single stage may be employed instead of the double stage of extraction illustrated. If this is done, the raffinate from the single stage becomes the product and the extract is passed through a steam stripper to form an overhead mixture of acetone and water which may be recycled for reuse as a solvent and the bottoms from the stripper may be returned to the polymerization vessel for further polymerization.

The polymer solution produced according to the present invention may be stored, shipped, pumped and otherwise handled without difficulty. The polymerization catalyst may be added to the solution just before it is used. The solution is suitable for dipping cloth or paper for uses such as the preparation of laminates. Paper which has been dipped in the solution may be dried to remove the solvents and may then be rolled or calendered. The final user of the paper need only apply heat and pressure to effect the final polymerization or cure. Fillers such as alpha cellulose may be added to the solution to make a plastic dough. The mixture can be milled until the solvent evaporates and the resulting dough is suitable for compression or extrusion molding.

The following non-limiting examples illustrate the operation of the invention:

*Example I*

A partial polymer of diallyl phthalate containing 30.5% polymer by weight was extracted with a solvent consisting of a mixture of acetone and water. A 2 stage countercurrent extractor was employed substantially like that illustrated in the drawing except the entire solvent feed was through line 20, no make-up solvent being added through lines 11 or 12. The temperature of operation was varied as well as the ratio of the solvent to partial polymer and the ratio of acetone to water. The raffinate was analyzed to determine its solvent content and also to determine the percentage of polymer. The percentage of polymer is expressed on a solvent free basis i. e. the balance is monomer. The following results were obtained:

| Experiment No. | Temp., °C. | Solvent to partial polymer (ratio by weight) | Percent acetone in solvent (balance water) | Analysis of raffinate ||| Percent diallyl phthalate recovered as polymer |
|---|---|---|---|---|---|---|---|
| | | | | Percent polymer | Percent solvent | Estimated viscosity in poises || |
| | | | | | | 21° C. | 42° C. | |
| 1 | 20-25 | 2.5/1 | 80 | >98 | 32.4 | 52 | 12 | 58.5 |
| 2 | 20-25 | 3.0/1 | 80 | >98 | 33.3 | 50 | 11 | 61.0 |
| 3 | 20-25 | 4.5/1 | 80 | >98 | 31.6 | 75 | 16 | 63.2 |
| 4 | 20-25 | 6.0/1 | 80 | >98 | 28.9 | 140 | 37 | 62.5 |
| 5 | 20-25 | 3.0/1 | 75 | >98 | 31.4 | 64 | 14 | 79.8 |
| 6 | 20-25 | 4.0/1 | 75 | >98 | 29.4 | 100 | 23 | 77.2 |
| 7 | 20-25 | 6.0/1 | 75 | >98 | 23.4 | | | 76.2 |
| 8 | 20-25 | 3.0/1 | 75 | >98 | 28.8 | 110 | 24 | 77.4 |
| 9 | 20-25 | 4.5/1 | 75 | >98 | 29.3 | 120 | 26 | 77.1 |
| 10 | 20-25 | 6.0/1 | 75 | >98 | 29.6 | 120 | 25 | 76.0 |
| 11 | 40 | 3.0/1 | 75 | >98 | 29.8 | 90 | 21 | 70.5 |
| 12 | 40 | 4.5/1 | 75 | >98 | 27.9 | 150 | 30 | 72.7 |
| 13 | 20-25 | 4.5/1 | 70 | 94.6 | 26.2 | 150 | 32 | 85.2 |
| 14 | 20-25 | 6.0/1 | 70 | >98 | 26.6 | 170 | 40 | 81.3 |

*Example II*

A two stage countercurrent extractor was used substantially like that illustrated in the drawing for the extraction of a partial polymer of diallyl phthalate containing 30.5% polymer. Test solvent was added through line 20 as well as through lines 11 and/or 12. The conditions of operation were varied as in Example I and the final raffinate was analyzed to determine its solvent content and also to determine the percentage of polymer on a solvent-free basis. The following results were obtained:

| Experiment No. | Temp., °C. | First Stage solvent [1] || Second Stage solvent || Analysis of Final Raffinate |||| Percent diallyl phthalate recovered as polymer |
|---|---|---|---|---|---|---|---|---|---|---|
| | | Solvent to polymer ratio | Percent acetone in solvent | Solvent to polymer ratio | Percent acetone in solvent | Percent polymer | Percent solvent | Est. viscosity in poises— || |
| | | | | | | | | at 21° C. | at 42° C. | |
| 15 | 20-25 | 1.5/1 | 70 | 1.5/1 | 85 | 95.8 | 41.7 | 6.6 | 1.7 | 65.6 |
| 16 | 40 | 1.5/1 | 70 | 1.5/1 | 85 | 97.9 | 46.0 | 3.3 | 0.7 | 62.3 |
| 17 | 20-25 | 2.09/1 | 67 | 1.73/1 | 83 | 97.1 | 39.1 | 14 | 2.8 | 75.2 |
| 18 | 40 | 2.09/1 | 67 | 1.73/1 | 83 | 98.2 | 41.6 | 8.5 | 1.9 | 71.5 |
| 19 | 40 | 0.984/1 | 43.5 | 2.91/1 | 78 | 97.8 | 34.9 | 31 | 7.0 | 75.0 |
| 20 | 40 | 1.22/1 | 35 | 2.91/1 | 83 | 95.4 | 42.5 | 1.5 | 1.3 | 76.5 |

[1] This composition is that of make-up solvent. Because this was mixed with second stage extract, the actual solvent used for extraction had a higher percentage of acetone and was of a higher solvent to polymer ratio than indicated.

We claim as our invention:

1. A process for producing a concentrated solution of diallyl phthalate partial polymers comprising polymerizing diallyl phthalate in a polymerization zone until polymerization is from 20% to 40% complete, contacting the partial polymer so produced with from 2.5 to 12 volumes per volume of partial polymer of a dual solvent, said dual solvent containing from 65% to 85% acetone and the balance water, whereby two phases are formed, separating the phases and subjecting the upper phase to steam stripping whereby an overhead fraction is produced comprising dual solvent and a bottoms is produced containing water and diallyl phthalate monomer, separating the water from the monomer and returning the monomer to the polymerization vessel, contacting the lower phase with from 2.5 to 12 volumes per volume of partial polymer of an acetone-water dual solvent containing from 80% to 87½% acetone to again form two phases, separating the phases, recovering the bottom phase as product and recycling the upper phase to the effluent of the polymerization zone, the above extractions being conducted at a temperature of from 0° C. to 40° C.

2. The process of claim 1 wherein from 3 to 5 volumes of the dual solvent are used in each extraction per volume of partial polymer.

3. A continuous process for producing a concentrated solution of diallyl phthalate polymer comprising polymerizing diallyl phthalate in a vessel until polymerization is 20% to 40% complete, contacting the partial polymer so produced with 2.5 volumes to 12 volumes per volume of partial polymer of a dual solvent consisting of 65% to 85% acetone, and the balance water, whereby two phases are formed, an upper phase containing part of said dual solvent and a major part of the diallyl phthalate monomer and lower phase containing dual solvent and a major part of the diallyl phthalate polymer, separating the phases, returning the upper phase to the polymerization zone, contacting the lower phase with 2.5 volumes to 12 volumes per volume of partial polymer of a dual solvent consisting of 80% to 87.5% acetone, and balance water, so as to form two more phases, separating the phases, returning the upper phase to the polymerization zone, and recovering the lower phase as the desired diallyl phthalate polymer concentrate.

4. A process for concentrating diallyl phthalate polymer comprising contacting a partial polymer of diallyl phthalate consisting of a mixture of diallyl phthalate monomer and polymer obtained by exposing monomeric diallyl phthalate to polymerizing conditions until 20% to 40% of monomer has been converted to soluble, fusible polymer, with 2.5 to 12 volumes per volume of partial polymer of a dual solvent consisting of 65% to 85% acetone, the balance being water, whereby two phases are formed, an upper phase containing part of said dual solvent and a major part of the diallyl phthalate monomer and a lower phase containing dual solvent and a major part of the diallyl phthalate polymer, separating the two phases, contacting the lower phase with 2.5 volumes to 12 volumes per volume of partial polymer of a dual solvent consisting of 80% to 87.5% acetone, and balance water, so as to form two more phases, separating the phases and recovering the lower phase as the desired diallyl phthalate polymer concentrate.

5. A continuous process for producing a concentrated solution of diallyl phthalate polymers comprising polymerizing diallyl phthalate in a vessel until it is 20% to 40% polymerized, contacting the partial polymer so produced with 2.5 volumes to 12 volumes per volume of partial polymer of a dual solvent consisting of 65% to 85% by weight of acetone, the balance being water, whereby two phases are formed, an upper phase containing part of said dual solvent and a major part of the diallyl phthalate monomer and lower phase containing dual solvent and a major part of the diallyl phthalate polymer, separating the two phases, returning the upper phase to the polymerization vessel, and recovering the lower phase as the desired diallyl phthalate polymer concentrate.

6. A process for concentrating diallyl phthalate polymers comprising contacting a partial polymer of diallyl phthalate consisting of a mixture of diallyl phthalate monomer and polymer obtained by exposing monomeric diallyl phthalate to polymerizing conditions until 20% to 40% of monomer has been converted to soluble, fusible polymer, with 3.5 to 6 volumes per volume of partial polymer of a dual solvent consisting of 65% to 85% by weight of acetone, the balance being water, whereby two phases are formed, an upper phase containing part of said dual solvent, and a major part of the diallyl phthalate monomer and a lower phase containing dual solvent and a major part of the diallyl phthalate polymer, separating the two phases and recovering the lower phase as the desired diallyl phthalate polymer concentrate, the process being conducted at a temperature between 0° C. and 40° C.

7. A process for concentrating diallyl phthalate polmers comprising contacting a partial polymer of diallyl phthalate consisting of a mixture of diallyl phthalate monomer and polymer obtained by exposing monomeric diallyl phthalate to polymerizing conditions until 20% to 40% of monomer has been converted to soluble, fusible polymer, with 2.5 volumes to 12 volumes per volume of partial polymer of a dual solvent consisting of 65% to 85% by weight of acetone, the balance being water, whereby two phases are formed, an upper phase containing part of said dual solvent and a major part of the diallyl phthalate monomer and a lower phase containing dual solvent, a major part of the diallyl phthalate polymer, separating the two phases and recovering the lower phase as the desired diallyl phthalate polymer concentrate.

8. A process for concentrating diallyl phthalate polymers comprising contacting a partial polymer of diallyl phthalate consisting of a mixture of 20% to 40% fusible, soluble polymer of diallyl phthalate and the balance being diallyl phthalate monomer, with 2.5 volumes to 12 volumes per volume of partial polymer of a dual solvent consisting of 65% to 85% by weight of acetone, the balance being water, whereby two phases are formed, separating the two phases, contacting the lower phase with about 2.5 volumes per volume of partial polymer of a dual solvent consisting of 80% to 87.5% acetone, the balance being water, so as to again form two phases, separating the two phases and recovering the bottom phase as the desired diallyl phthalate polymer concentrate, the above extractions being conducted at a temperature between 0° C. and 40° C.

JOHN ANDERSON.
JOHN W. MECORNEY.
GEORGE E. HAM.

(References on following page)

REFERENCES CITED

The following references are of record in the file of this patent:

UNITED STATES PATENTS

| Number | Name | Date |
|---|---|---|
| 2,024,666 | Staud et al. | Dec. 17, 1935 |
| 2,273,891 | Pollack et al. | Feb. 24, 1942 |

OTHER REFERENCES

Cragg et al.: Chemical Reviews (August 1946), pp. 79, 82, 83, 89, 90, 99–102, 104–105, and 110–118.

Rogovin et al.: Kolloid-Z, 76, 210–13 (1936).

Craik et al.: Trans. Faraday Soc. 27, 756–67 (1931.)